Mar. 3, 1925.

T. R. COOK

BATTERY CASE

Filed Nov. 25, 1921

1,528,290

INVENTOR:
Thomas R. Cook,
BY A. L. Vencill
His ATTORNEY

Patented Mar. 3, 1925.

1,528,290

UNITED STATES PATENT OFFICE.

THOMAS R. COOK, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

BATTERY CASE.

Application filed November 25, 1921. Serial No. 517,494.

*To all whom it may concern:*

Be it known that I, THOMAS R. COOK, a citizen of the United States, residing at Pittsburgh, in the county of Allegheny and State of Pennsylvania, have invented certain new and useful Improvements in Battery Cases, of which the following is a specification.

My invention relates to battery cases, that is, cases which are adapted to contain two or more storage battery cells or jars.

One object of my invention is the provision of improved means for holding the cells or jars in place in the case.

I will describe one form of case embodying my invention, and will then point out the novel features thereof in claims.

Figure 1:
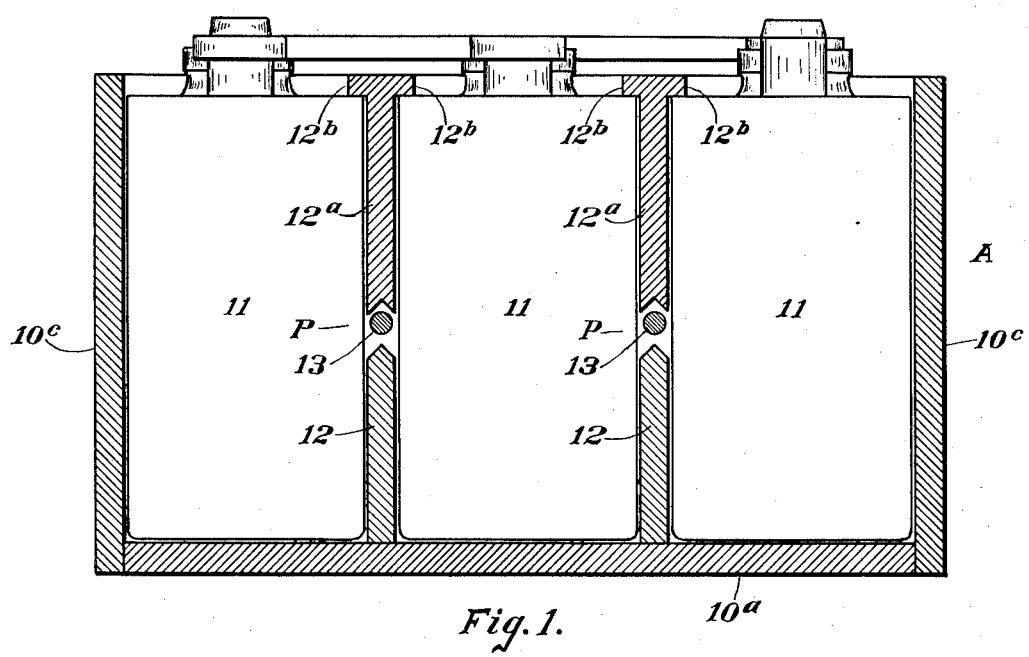
Figure 2:
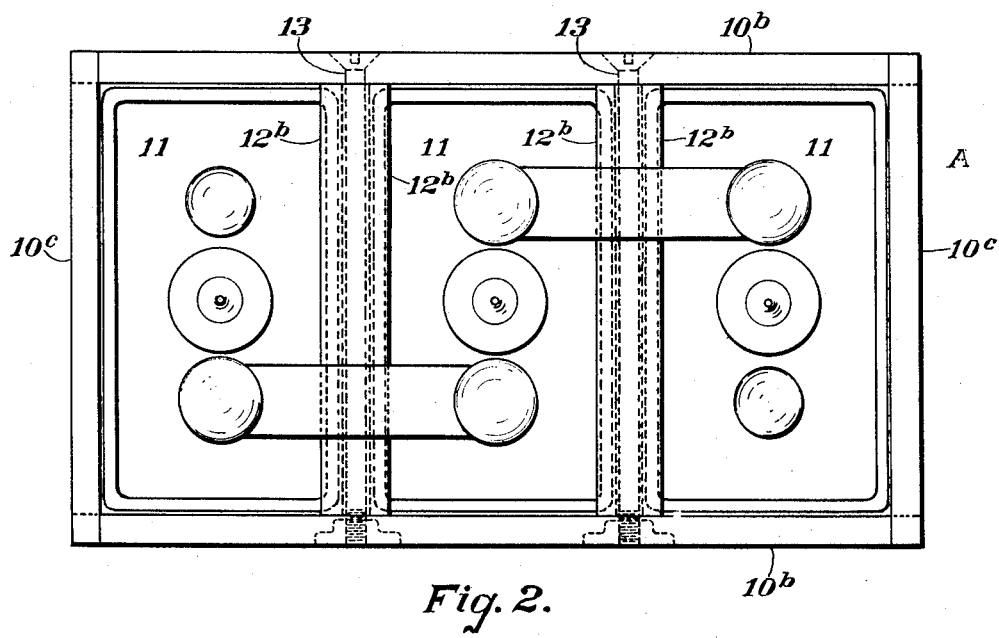

In the accompanying drawings, Fig. 1 is a view showing in vertical section one form of case embodying my invention with the battery cells in place therein. Fig. 2 is a top plan view of the case and cells shown in Fig. 1.

Similar reference characters refer to similar parts in each of the views.

Referring to the drawings, the reference character A designates a case comprising as usual a bottom member $10^a$, two side members $10^b$, $10^b$, and two end members $10^c$, $10^c$, the case being open at the top. This case may be made of any suitable material, such for example as wood. As here shown, the case A contains three storage battery cells 11, which cells are separated by two partitions P. Each partition comprises a lower section 12 and an upper section $12^a$, which sections are vertically aligned and are spaced as shown for a purpose which will appear hereinafter. The upper section $12^a$ of each partition is substantially T-shaped in vertical cross-section, that is, its upper edge is provided with two flanges $12^b$ which overhang the adjacent cells 11 and so will prevent these cells from rising if the partitions are held in place.

Suitable means are provided for removably holding the partitions P in place in the case A, which means, in the form here shown, comprises bolts 13 which pass through the opposite side members $10^b$, $10^b$, and through the space between the sections of the partition. The length of each partition P is substantially the same as the inside width of the case before the bolts are tightened, so that when the bolts are tightened the side members $10^b$, $10^b$, are compressed against the partitions thereby holding the latter firmly in place. It follows, of course, that the flanges $12^b$ on each partition prevent the adjacent cells from rising from place in the case. The length of each cell 11, on the other hand, is the same as, or slightly less than, the length of the partitions, so that even when the bolts are tightened the side members $10^b$, $10^b$ exert little or no pressure on the cells. This is an important feature of my invention, because the cells are usually made of glass or hard rubber, and in either form they are readily susceptible to breakage when subjected to compression. It will be observed that by virtue of my invention little or no pressure is exerted on the cells, and yet the cells are effectively prevented from rising in the case.

If desired, the lower section 12 of each partition may be made slightly shorter than the upper section $12^a$, thereby increasing the pressure exerted on the upper section when the bolt 13 is tightened.

Although I have herein shown and described only one form of battery case embodying my invention, it is understood that various changes and modifications may be made therein within the scope of the appended claims without departing from the spirit and scope of my invention.

Having thus described my invention, what I claim is:

1. A battery case comprising the usual bottom, side and end members, a partition in said case formed of spaced lower and upper sections, means located in the space between said sections for compressing the side members of the case against said partition to hold the latter in place, a battery cell in said case, and means associated with said upper partition section for holding said battery cell in place in the case.

2. A battery case comprising the usual bottom, side and end members, a partition located in said case, means for compressing the side members of the case against said partition to hold the latter in place, a battery cell in said case, and means associated with said partition for holding said battery cell in place in the case.

3. A battery case comprising the usual bottom, side and end members, a partition in said case formed of spaced lower and upper sections, a bolt passing through the side members and the space between said partition sections for compressing the side members against the partition, a battery cell in said case, and means associated with said upper partition section for holding said battery cell in place in the case.

4. A battery case comprising the usual bottom, side and end members, a partition located in said case, a bolt passing through the side members of the case for compressing such members against said partition to hold the latter in place, a battery cell in said case, and means associated with said partition for holding said battery cell in place in the case.

5. A battery case comprising bottom, side and end members, a partition in said case comprising spaced lower and upper sections, the upper section being T-shaped in cross-section whereby it is adapted to overhang battery cells and hold them in place in the case, and means for compressing the side members of the case against said partition to hold it firmly in place.

6. A battery case comprising bottom, side and end members, a partition in said case comprising spaced lower and upper sections, the upper section being T-shaped in cross-section whereby it is adapted to overhang battery cells and hold them in place in the case, and a bolt passing through said side members and the space between the partition sections for compressing the side members against said partition.

7. A battery case comprising bottom, side and end members, a partition substantially T-shaped in cross-section whereby it is adapted to overhang battery cells and hold them in place in the case, and means for compressing said side members against said partition to hold it firmly in place.

8. A battery case comprising bottom, side and end members, a partition substantially T-shaped in cross-section whereby it is adapted to overhang battery cells and hold them in place in the case, and a bolt passing through said side members for compressing them against said partition to hold the latter firmly in place.

9. A battery case comprising bottom, side and end members, a partition in said case having a flange along its upper edge adapted to overhang a battery cell to prevent it rising from place in the case, and means for compressing the side members against said partition to hold it in place.

10. A battery case comprising bottom, side and end members, a partition in said case having a flange along its upper edge adapted to overhang a battery cell to prevent it from rising from place in the case, and means for removably holding said partition in place in the case.

11. In combination, a battery case, a partition in case case, means for removably holding said partition in place in said case, a battery cell in said case, and means associated with said partition for preventing said battery cell from rising from place in the case.

12. In combination, a battery case, a partition in said case, means for removably holding said partition in place in said case, a battery cell in said case, and means associated with said partition for holding said battery cell in place in said case.

In testimony whereof I affix my signature.

THOMAS R. COOK.